Sept. 21, 1926.
C. B. BAILEY
GASKET
Filed June 29, 1925
1,600,386
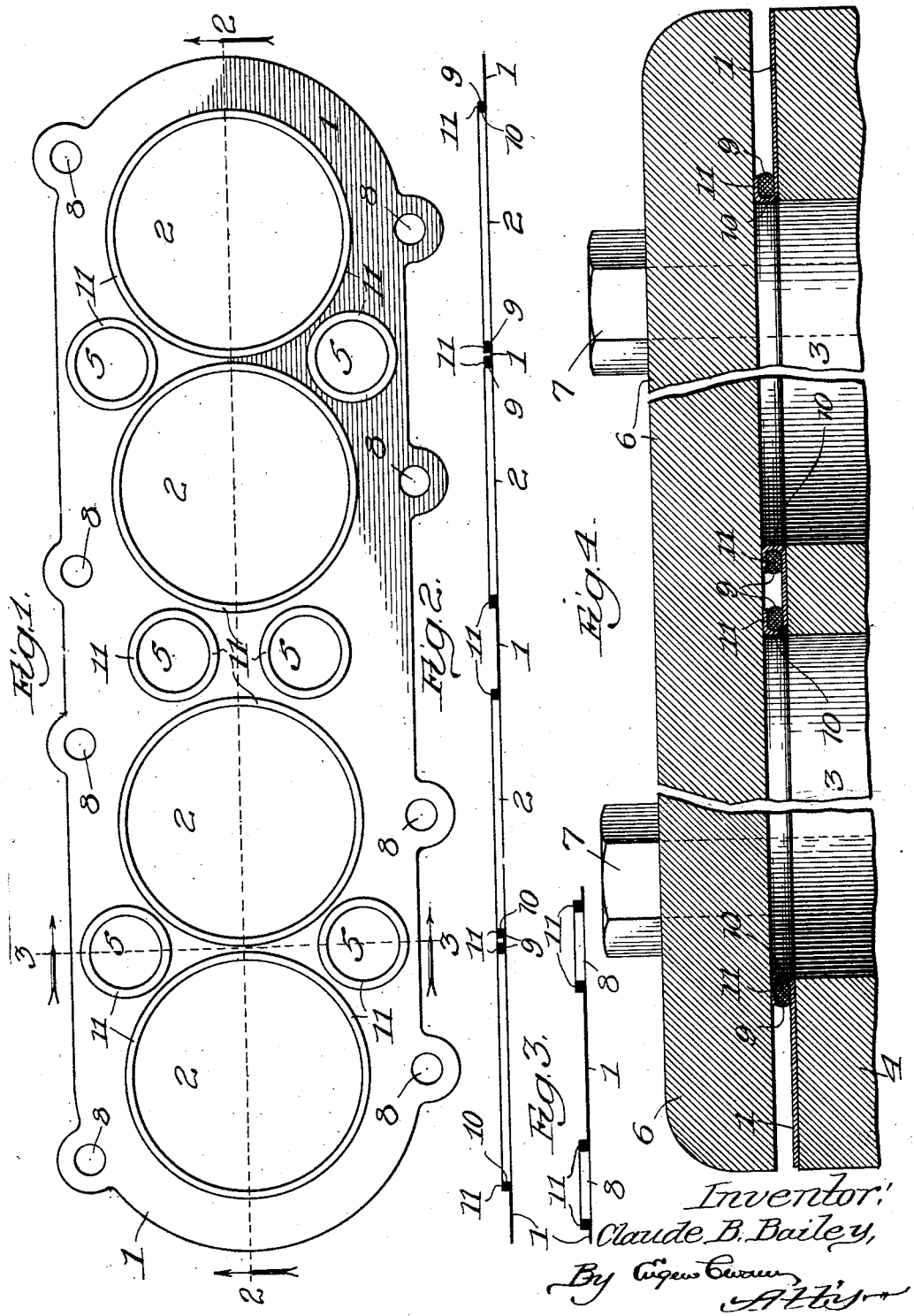
Inventor:
Claude B. Bailey, Patented Sept. 21, 1926.

1,600,386

UNITED STATES PATENT OFFICE.

CLAUDE B. BAILEY, OF WYANDOTTE, MICHIGAN, ASSIGNOR TO McCORD RADIATOR & MFG. CO., OF DETROIT, MICHIGAN, A CORPORATION OF MAINE.

GASKET.

Application filed June 29, 1925. Serial No. 40,177.

The gasket contemplated by this invention has a flat body portion of a single layer of sheet metal with sheet metal channel members about the port holes of the gasket, and with said channel members carried by the gasket body on one side thereof and having asbestos or other packing rings in the channels of said members to provide the cushions for the gaskets without using an asbestos layer extending over the entire area of the gasket or being coextensive therewith, as in gaskets of this general character as heretofore made, thus reducing the manufacturing cost of the gasket and providing a simplified and durable structure capable of producing tight joints at less pressure than heretofore.

The invention consists further in the matters hereinafter described and claimed.

In the accompanying drawings—

Fig. 1 is a plan view of a cylinder head gasket constructed in accordance with my invention;

Figs. 2 and 3 are longitudinal and transverse views, respectively, on lines 2—2 and 3—3 of Fig. 1; and Fig. 4 is a vertical sectional view showing the gasket in place between a cylinder block and its head, the valves and water passages being omitted for the sake of illustration.

As shown in the drawings, the gasket has a flat body portion 1 stamped or otherwise formed from a single layer of sheet metal, such as copper, brass, aluminum, zinc or other suitable material. Said gasket when of the cylinder head type has a plurality of relatively large port holes or openings 2, 2 formed in the body 1 and disposed in a row lengthwise thereof with said holes substantially the same in size and arranged to fit about the cylinder bores 3, 3 in a cylinder block 4, as shown in Fig. 4.

As shown in Fig. 1, the body 1 is further provided with a plurality of smaller port holes 5, 5 also of the same size and arranged to fit about the registering water passages (not shown) in the cylinder block 4 and its head 6, respectively, when the gasket is clamped between such parts by the usual studs or bolts 7, 7 as in structures of this kind. The gasket has holes 8, 8 at its margins to receive these studs.

The gasket shown in the drawings is designed for a four cylinder internal combustion engine with overhead valves, as used in Chevrolet cars; it being of course understood, however, that the gaskets of my invention with the required port hole arrangement may be made for other motors with the same or a greater number of cylinders and with different valve arrangements.

The metal of the body 1 about the port holes 2 and 5 is flanged or turned up to one side of the body to provide channel members to receive and retain rings 9 of asbestos or other suitable compressible fibrous material. These rings 9 together with the metal forming the channels are relatively narrow in width as compared to the width of the body 1 and, being thicker than the body, provide the cushions for the gasket and allow all of the available pressure exerted on the gasket on being clamped in place to be concentrated on and confined to said portions to obtain tight joints at the port holes, without distributing and wasting the pressure over the entire surface or area of the gasket as with cylinder head gaskets as heretofore constructed.

This is an important feature of my invention because it enables tight joints to be had immediately at the port holes with less pressure, and smaller studs may be used or the same size studs as now generally used may be employed with less strain or tension on them to provide tight joints especially for high pressures as encountered in the cylinders of internal combustion engines.

In turning the metal of the body 1 to provide the channels, flanges 10, 11 are provided about each port hole 2 and 5. The flanges 10 project outward from the body 1 substantially at right-angles thereto and extend through the associated rings 9 about the inner edges thereof to hold the rings from lateral displacement on the body and also to protect them from the fluids flowing through and the pressures in the port holes. The other flanges 11 are the outer marginal portions of the flanges 10 and are bent against the rings 9 to hold them against the body 1 and also to provide metal seats for the head 6, as shown in Fig. 4.

The body 1 being entirely of sheet metal, simplifies the structure and reduces the cost of manufacture. With the asbestos cushions being in the form of relatively narrow rings 9, the cost is further reduced by eliminating the use of asbestos layers extending over the entire area of the gaskets or being coextensive therewith, as heretofore.

Gaskets embodying my invention may take various shapes and sizes and be capable of various uses.

I claim as my invention:

1. A gasket having a body of a single layer of sheet metal and having a port hole therein, a sheet metal channel member, and an asbestos ring therein both narrower than the width of said body and on one side thereof about said port hole, said channel member being carried by said body at said port hole and being substantially as wide as said ring.

2. A gasket having a body of a single layer of sheet metal and having a port hole therein, a channel member, and an asbestos ring therein both narrower than the width of said body and on one side thereof about said port hole, said channel member being flanged up from the metal of the body about said port hole and being substantially as wide as said ring.

3. A cylinder head gasket having a body of a single layer of sheet metal and having a plurality of port holes therein, sheet metal channel members about said port holes and carried by the body on one side thereof, and asbestos or like rings in the channels of said members and held thereby against said body layer.

4. A cylinder head gasket having a body of a single layer of sheet metal and having a plurality of port holes therein, asbestos or like rings about said port holes on one side of said body, and flanges turned outward from the metal of the body at said port holes and extending through said rings, said flanges having their outer marginal portions bent against the rings for holding the same against said body.

In testimony whereof I affix my signature this 24 day of June, 1925.

CLAUDE B. BAILEY.